United States Patent [19]

Bischoff et al.

[11] Patent Number: 5,327,310
[45] Date of Patent: Jul. 5, 1994

[54] THIN FILM CONTACT RECORDING HEAD

[75] Inventors: Peter G. Bischoff, Cupertino; Chak M. Leung, Palo Alto; Stephen S. Murray, Fremont, all of Calif.

[73] Assignee: Read-Rite Corporation, Milpitas, Calif.

[21] Appl. No.: 904,033

[22] Filed: Jun. 25, 1992

[51] Int. Cl.$^5$ .............................................. G11B 5/60
[52] U.S. Cl. ...................................................... 360/103
[58] Field of Search ......................................... 360/103

[56] References Cited

U.S. PATENT DOCUMENTS

| | | | |
|---|---|---|---|
| 4,757,402 | 7/1988 | Mo | 360/103 |
| 4,761,699 | 8/1988 | Ainslie et al. | 360/103 |
| 4,789,914 | 12/1988 | Ainslie et al. | 360/103 |
| 4,962,437 | 10/1990 | Wilcox | 360/103 |
| 5,001,583 | 3/1991 | Matsuzaki | 360/103 |
| 5,023,738 | 6/1991 | Prenosil | 360/103 |
| 5,114,913 | 5/1992 | Coufal et al. | 360/103 |
| 5,184,263 | 2/1993 | Fukakusa et al. | 360/103 |

FOREIGN PATENT DOCUMENTS

| | | | |
|---|---|---|---|
| 12917 | 1/1987 | Japan | 360/103 |
| 74114 | 4/1988 | Japan | 360/103 |
| 127317 | 5/1991 | Japan | 360/103 |

Primary Examiner—John T. Kwon
Attorney, Agent, or Firm—Nathan N. Kallman

[57] ABSTRACT

A thin film magnetic head assembly useful for contact recording in a disk drive comprises an air bearing slider formed with only a single air bearing rail. The slider is substantially L-shaped having a leg portion on which a pedestal with an air bearing surface is provided. A wear pad is formed on the pedestal and encompasses the pole tips and transducing gap of the transducer. The wear pad makes contact with the magnetic disk during operation of the disk drive. The small area of the wear pad makes minimal contact with the surface of the magnetic disk so that frictional effects are significantly reduced thereby extending the wear life of the magnetic head. An alternative embodiment of a contact head slider uses a tripad design wherein the front pads fly relative to the disk and the rear pad which supports the transducer is in contact with the rotating disk during operation of a disk drive.

12 Claims, 10 Drawing Sheets

THIN FILM CONTACT RECORDING HEAD

FIELD OF THE INVENTION

This invention relates to a thin film magnetic recording head used for contact or pseudo-contact recording.

DESCRIPTION OF THE PRIOR ART

A major objective in the design of data recording systems, such as disk drives, is to achieve high packing density of recorded information so that data storage capacity is maximized. One factor that enables high density recording is the small length of the transducing gap of the recording magnetic head. The smaller the length of the gap as measured in the direction of movement of the data tracks relative to the magnetic head, the smaller is the wavelength of the data signal which can be recorded, thereby increasing the density of the recorded data. Therefore, thin film heads which have very small gap lengths, are presently used extensively in disk drives.

An increase in packing density of the recorded data can also be achieved during recording by having the magnetic head in contact or disposed very close (in pseudo-contact) with the recording medium or disk. Hereinafter reference to a contact recording head may be construed to include a pseudo-contact head. In a contact head recording system, the magnetic heads and disks are subject to wear and damage resulting from frictional effects and head crashes, particularly experienced during starting and stopping of drive operation. As disk wear increases, the thin film of magnetic coating on the disk is worn away. As a result, there may be a loss of data. These problems are accentuated with sliders of large mass and weight. By making the size and mass of the slider much smaller, the slider and its transducer can fly close to or in contact with the surface of the magnetic disk with reduced deleterious effects. It is known that as the linear dimensions of a slider are made smaller, the mass of the slider is reduced accordingly by a cubic factor.

Thin film magnetic heads generally comprise at least one thin film transducer having a nonmagnetic gap that is deposited on a slider element formed with an aerodynamic surface. In a typical prior art head, the aerodynamic surface of the slider has two spaced longitudinal rails that are tapered at the leading edge. The rails create a positive pressure region so that air lift is provided to the slider as it flies over the disk. A spring loaded flexure provides a load gram force that opposes the air lift force. The flexure is mounted to a head arm assembly that is coupled to an actuator, such as a linear or rotary voice coil motor. The flying height of the slider is determined by the aerodynamic lift force and the opposing applied load force.

During operation, the magnetic head is moved to selected data tracks in response to commands from a controller or microprocessor. With the twin rail slider, it has been found difficult to obtain a very low flying height or to effectuate contact recording. To obtain low flying height, a large preload is needed which increases friction. Alternatively narrow rails may be used in the twin rail slider but if the rails are too narrow, it becomes difficult or virtually impossible to accommodate and support the transducer structure. Narrow rails also produce undesirable flying characteristics at high skew angles of the head relative to the disk surface, such as experienced with rotary actuators.

SUMMARY OF THE INVENTION

An object of this invention is to provide a thin film contact recording head that realizes a substantial improvement in high density data recording.

Another object of this invention is to provide a thin film head having a substantially reduced mass and weight wherein frictional effects and the volume of wear are minimized.

Another object is to provide a thin film contact recording head for use in a disk drive wherein head crashes and data loss are virtually eliminated.

In the preferred embodiment of this invention, a thin film magnetic recording head slider useful for contact or pseudo-contact recording is configured in an L-type shape having a longitudinal rectangular recessed section and a relatively short projecting leg that extends orthogonally to the recessed section. A thin film transducer is deposited on an exposed side of the projecting leg and defines a transducing gap at an air bearing surface at the top of the leg. A wear pad is formed at the air bearing surface adjacent to the transducing gap of the head. In effect, the head slider comprises a single rail and does not require cutting and shaping two or more rails, as practised in the prior art.

In an alternative embodiment, a contact head slider is configured with a tripad design having two pads at the front of the slider and one pad at the rear of the slider where the transducing gap is located. The location and geometry of the pads, as well as the torque angle of the suspension and flexure to which the head slider is mounted, determine the contact characteristics of the slider during recording operation.

BRIEF DESCRIPTION OF THE DRAWINGS

The invention will be described in greater detail with reference to the drawings in which.

It should be understood that for the purpose of convenience and clarity of explanation, the Figures of the drawings are not shown in true proportions.

DETAILED DESCRIPTION OF THE INVENTION

Figure 1:
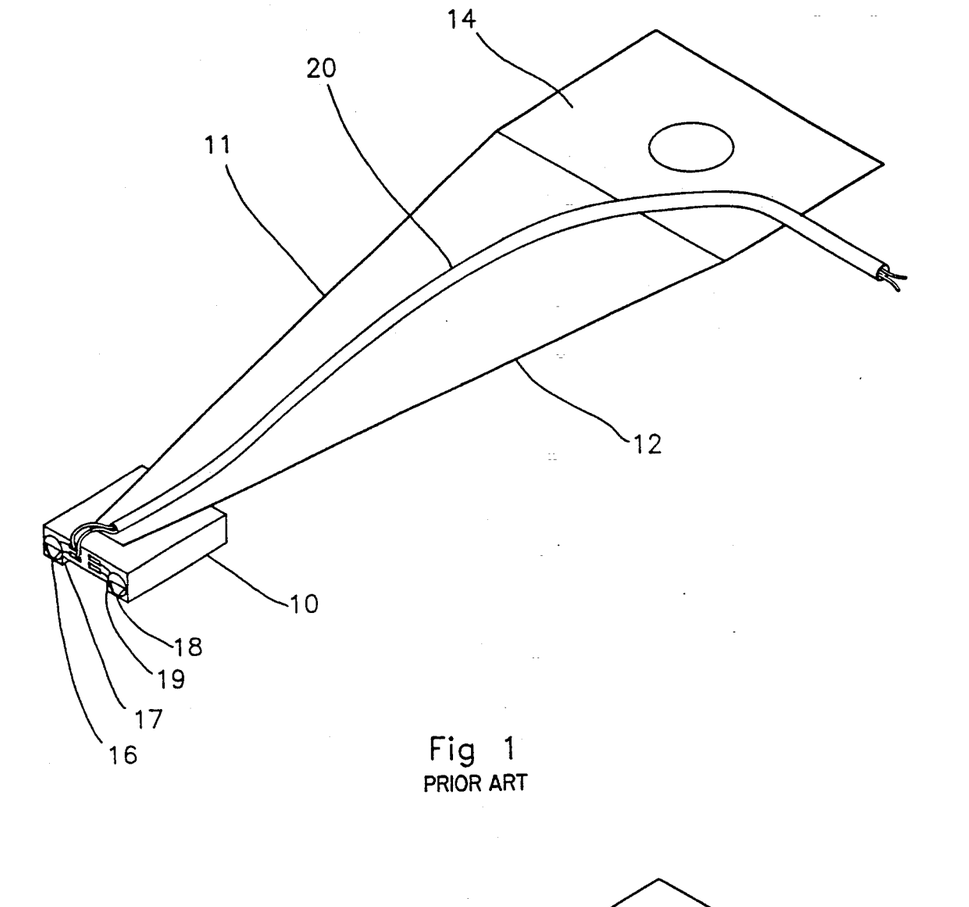
FIG. 1 is an isometric view of a magnetic head arm assembly, showing a two rail head slider mounted to a flexure, as known in the prior art.

With reference to FIG. 1, a prior art head arm assembly 11 typically used in disk drives includes a two rail slider 10 that is mounted at the end of a load beam or spring loaded flexure 12. The flexure 12 is joined to a mount element 14 which is attached to an actuator (not shown). Thin film transducers 16 and 18, which were deposited during wafer and slider fabrication, are disposed at the trailing ends of rails 17 and 19. A wire cable 20 conducts recording and readout data signals to and from the transducer 16 to a data processor. During operation of the disk drive, the actuator moves the head arm assembly 11 to position the operative thin film transducer 16 at selected data tracks of a rotating disk in response to commands received from a microprocessor or controller.

Figure 2A:
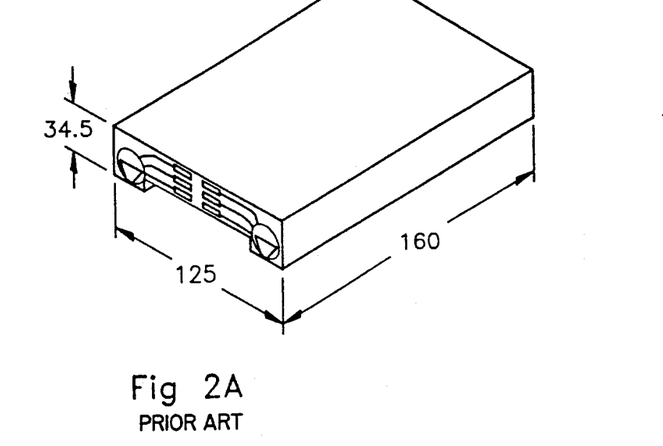
FIGS. 2A-2C are isometric views of a standard magnetic head slider, microslider and nanoslider respectively, as used in the prior art.
Figure 2B:
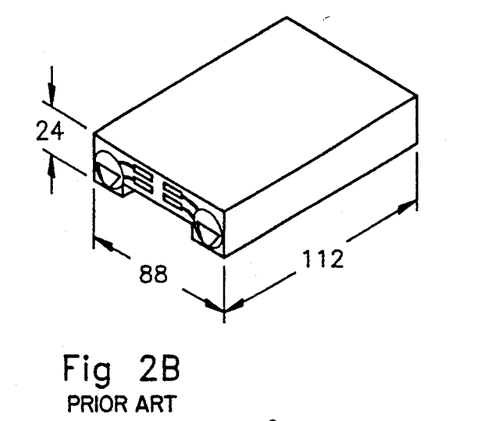
Figure 2C:
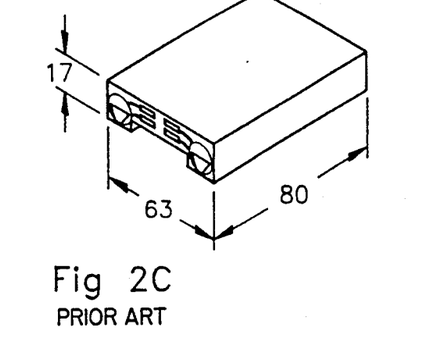

With the advent of laptop and notebook portable computers it became highly desirable to reduce the weight and the size of the computer components in order to conserve space. As shown in FIGS. 2A–2C, head technology progressed from a standard size two rail slider (FIG. 2A), to a microslider (FIG. 2B) about 70% of the size of the standard slider in linear dimension, and then to a nanoslider (FIG. 2C) which is about 50% of the size of the standard slider in linear dimension. The dimension numbers in FIGS. 2A–2C are in milli-inches and are only illustrative.

Figure 3:
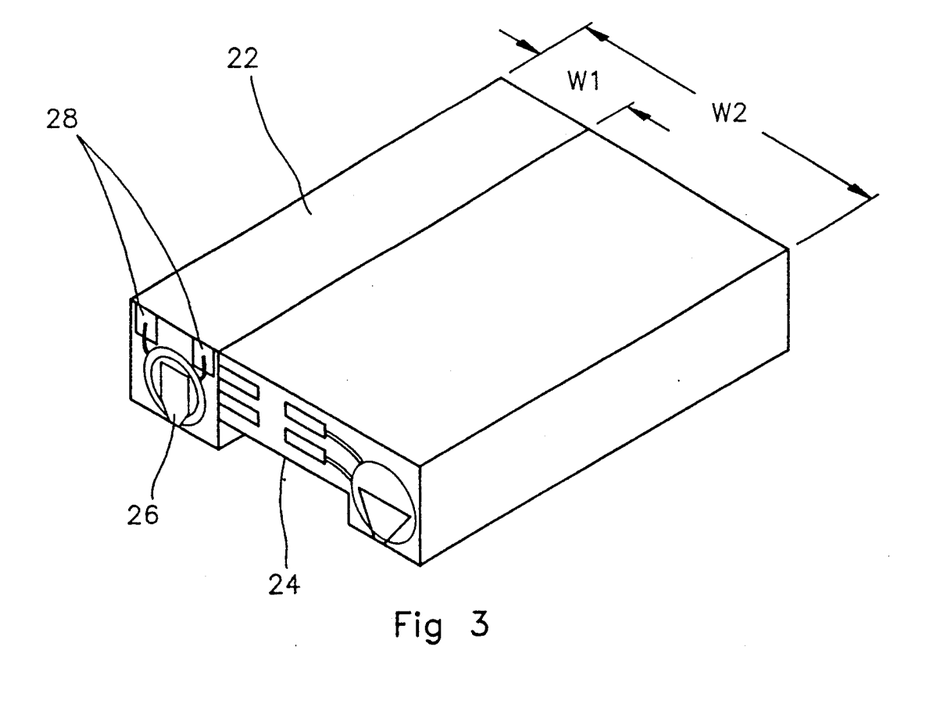
FIG. 3 is an isometric enlarged view of a two rail microslider, such as illustrated in FIG. 2B, showing a transducer at the end of a slider rail.

FIG. 3 shows an enlarged view of the microslider of FIG. 2B and serves to compare the size and width $W_1$ of a single rail slider 22, as implemented with the present invention, with the conventional two rail slider 24 having a much larger width $W_2$.

Figure 4:
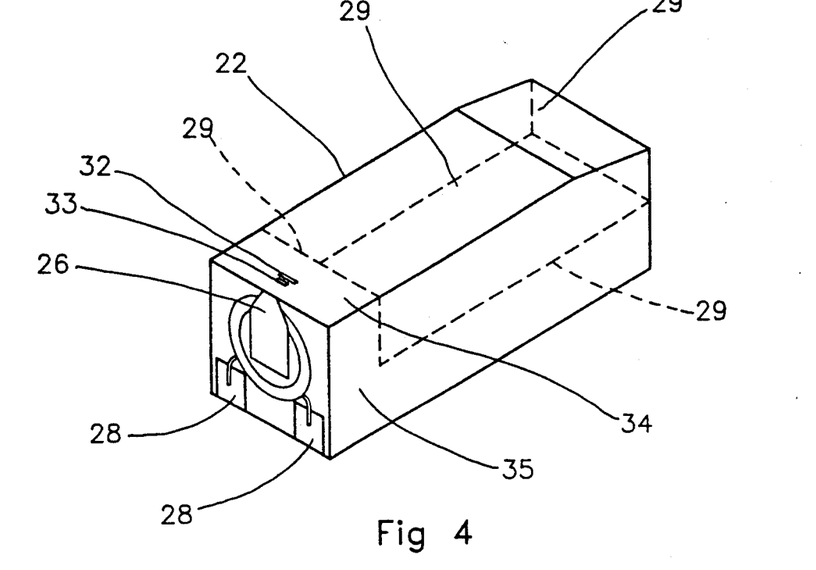
FIG. 4 is an isometric view of a single rail head slider, with an air bearing cutout represented by dashed lines, made in accordance with this invention.
Figure 5:
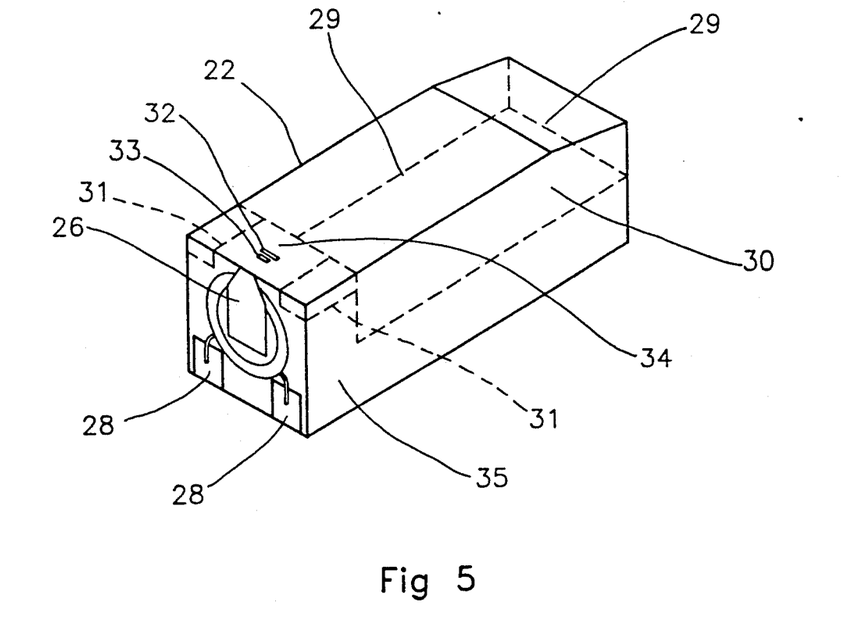
FIG. 5 is a representation of the novel single rail head slider, showing additional cutout portions to define a wear pad area adjacent to the thin film magnetic transducer.
Figure 6:
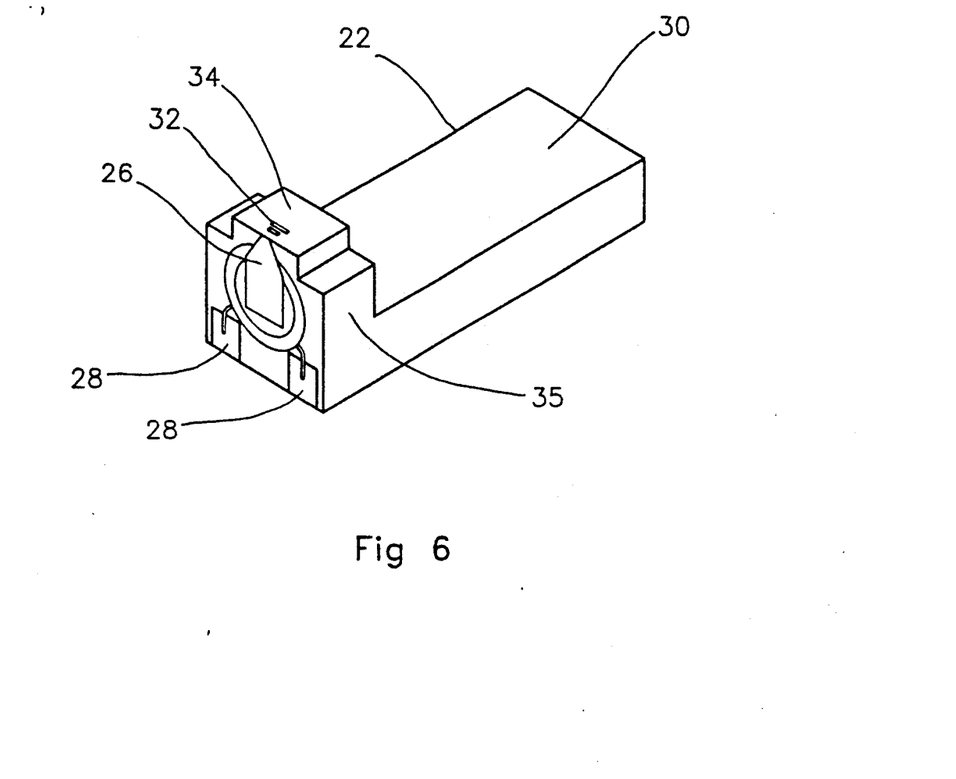
FIG. 6 depicts the single rail head slider with the cutout sections removed.
Figure 7:
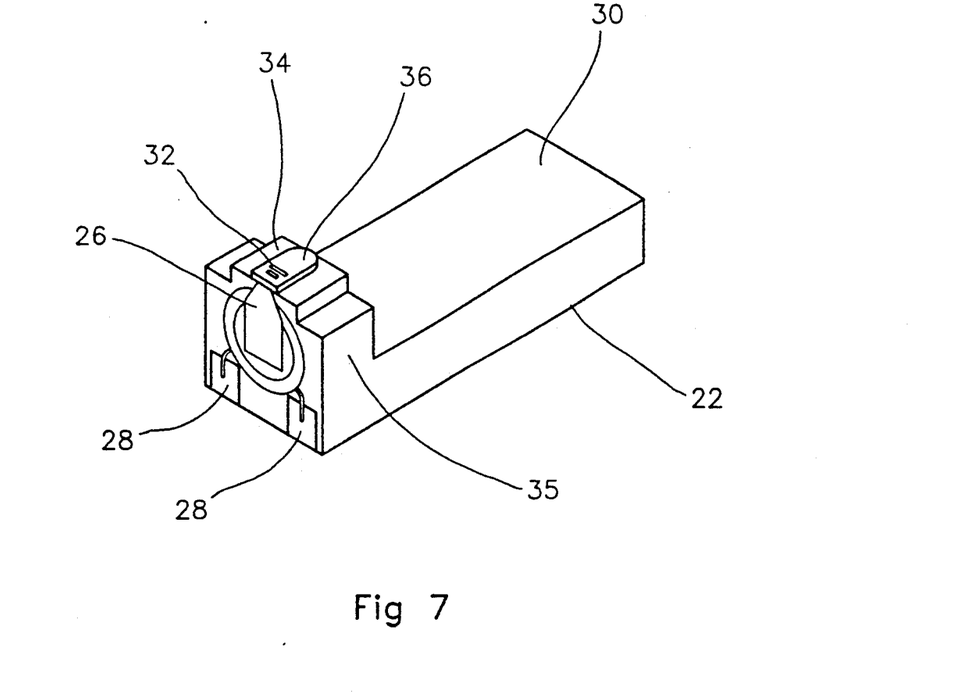
FIG. 7 shows the single rail head slider with a configured wear pad adjacent to the thin film transducer.

As shown in FIG. 4, the contact head slider of this invention is made from a ceramic material in an L-shaped form with a longitudinal recessed section 30 and a short leg 35. A thin film transducer 26 and bonding pads 28 are disposed on the exposed side of the short leg 35 and at the trailing edge of the single rail slider 22. In production, the single rail head slider 22 is machined and cut by diamond saw for example, as indicated at the dashed lines 29 in FIG. 4. The cutting at the dashed lines 31 in FIG. 5 results in a pedestal 34 that is formed at the top of the leg 35 and functions as the single rail of the slider. The top exposed portion of the pedestal 34 includes a transducing gap 33 of the transducer 26 that is defined by pole tips 32. The pedestal 34 effectively serves as the air bearing surface of the slider 22 which makes contact with a rotating disk during operation of a disk drive. In accordance with this invention, the pedestal 34 is further shaped by conventional masking and etching to define an oval type wear pad 36 having a relatively small area, as depicted in FIG. 7. The wear pad reduces the effective contact area and air bearing surface of the slider that interacts with the rotating disk thereby minimizing wear of the head and the disk with resultant increase in operating life. The reduced slider size and mass enables assembling the head assembly in small spaces thus allowing reduction in overall height and size of small disk drives, such as used with laptop computers. The small slider affords stacking more disks in a given physical space in a disk drive.

Figure 8:
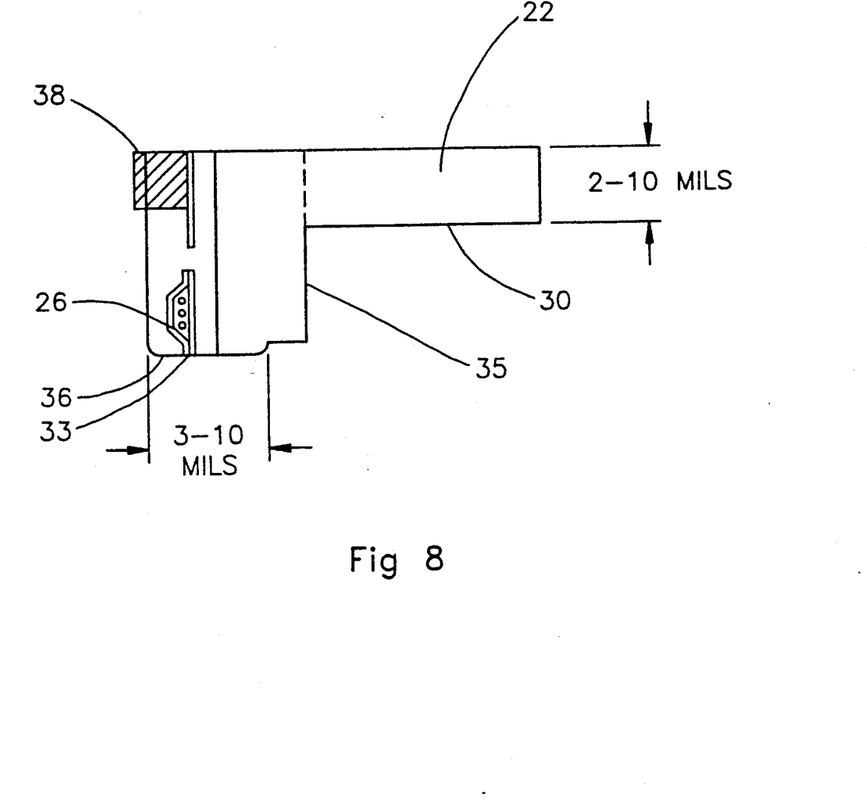
FIG. 8 is a cross-sectional side view of the single rail slider of FIG. 7 showing an exposed bonding pad.

In FIG. 8, the single rail slider 22 is shown in a cross-section side view with an exposed bonding pad 38 used for alternate wire bonding. The sizes of the transducer 26 and bonding pad 38 are exaggerated in comparison to the slider body 22 to aid in the visualization of the slider portions. In an embodiment of the invention, the length of the wear pad 36, which is adjacent to the pole tip area of the transducer 26, is in the range of 3–10 milli-inches. The height of the recessed section is in the range of 0.5 to 2 milli-inches and the height of the pedestal is about 2 to 8 milli-inches.

Figure 9:
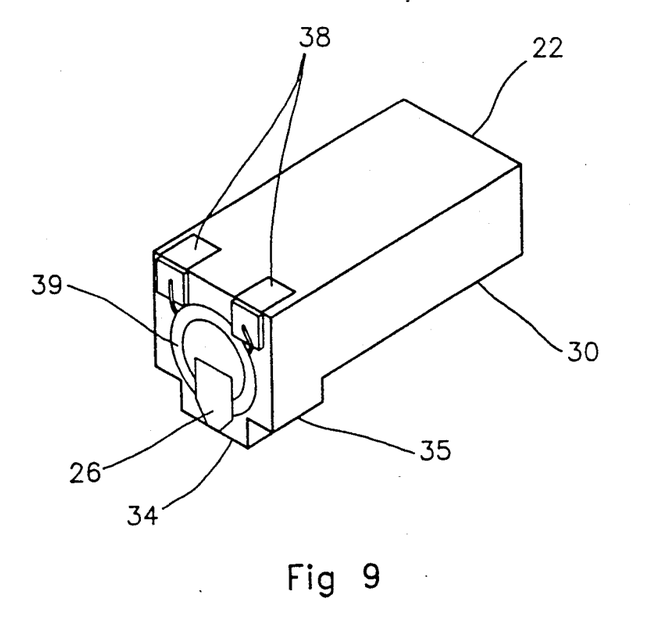
FIG. 9 is a top isometric view of the single rail slider of FIG. 7.

The top view of FIG. 9 illustrates the bonding pads 38 available for wiring connection. The bonding pads 38 are located at the top surface of the slider 22 for ease of wiring connection between the transducer coil 39 and head circuitry.

Figure 10:
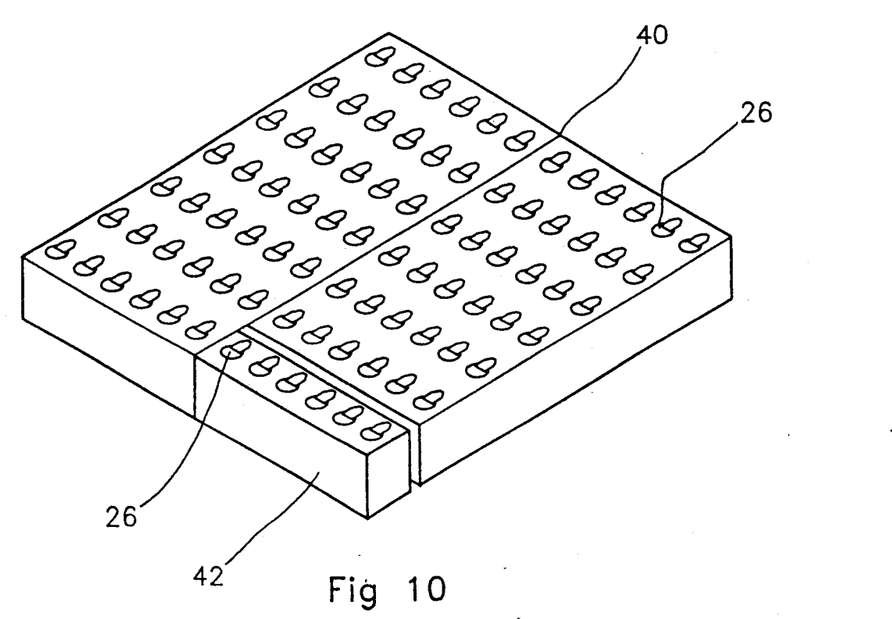
FIG. 10 is an isometric view of a ceramic wafer, showing a number of thin film transducers deposited in rows and columns, and a row bar with six transducers partially separated from the wafer.
Figure 11:
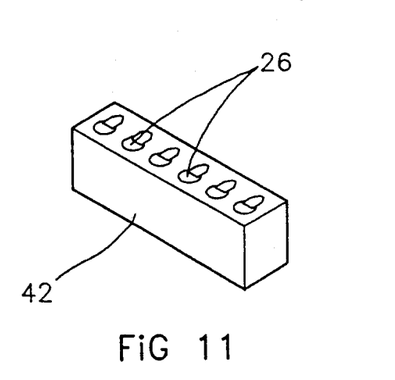
FIG. 11 is an isometric view of a separated row bar.
Figure 12:
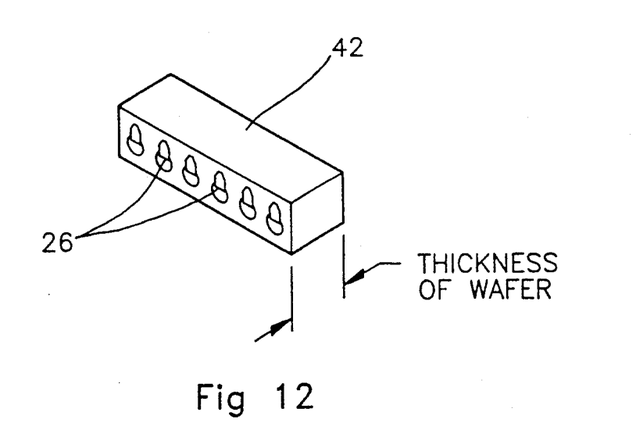
FIG. 12 is a side view of the bar shown in FIG. 11.
Figure 13:
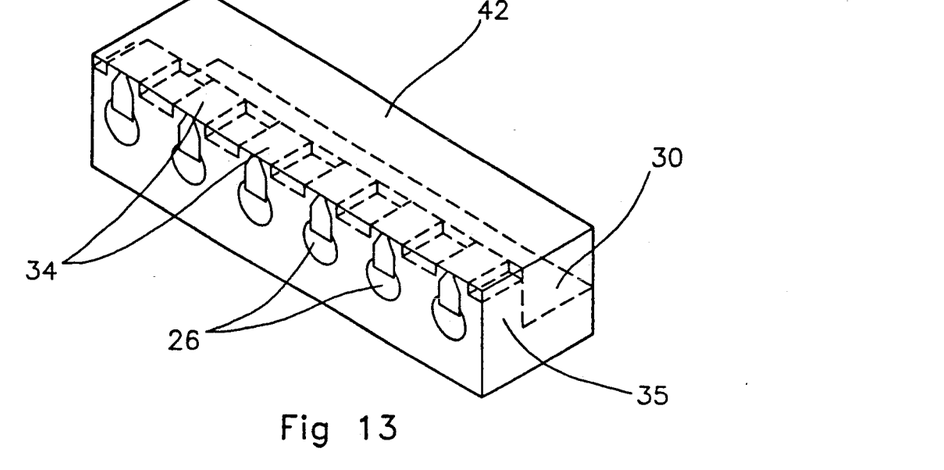
FIG. 13 is an enlarged view of the bar of FIG. 11 showing machined portions for defining the single rail sliders.
Figure 14:
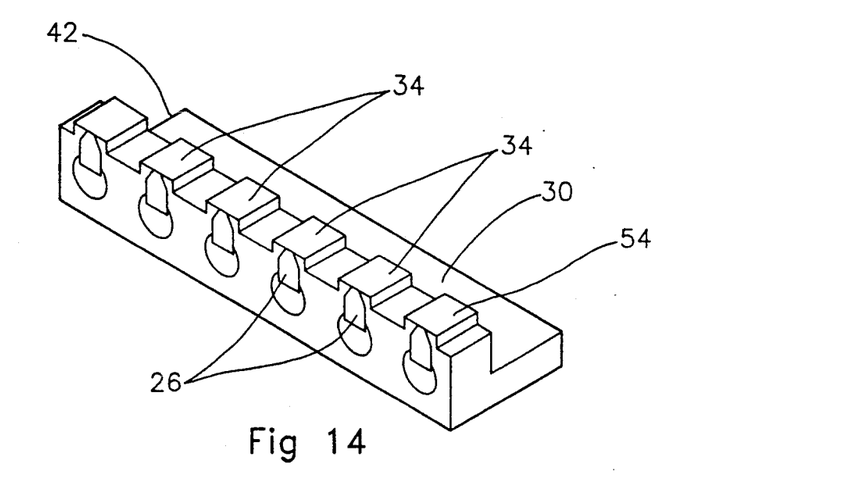
FIG. 14 is an isometric view of the bar of FIG. 13 after the machining process.
Figure 15A:
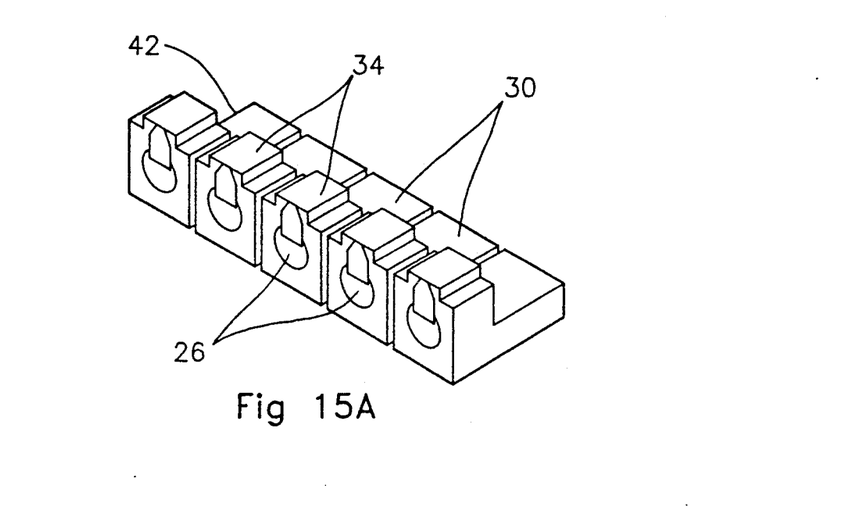
FIGS. 15A–15B show the separation of an individual single rail slider from the row bar.
Figure 15B:
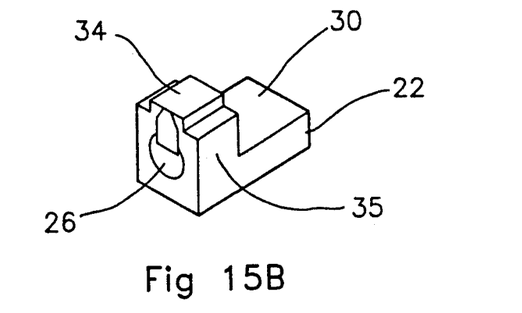
Figure 16:
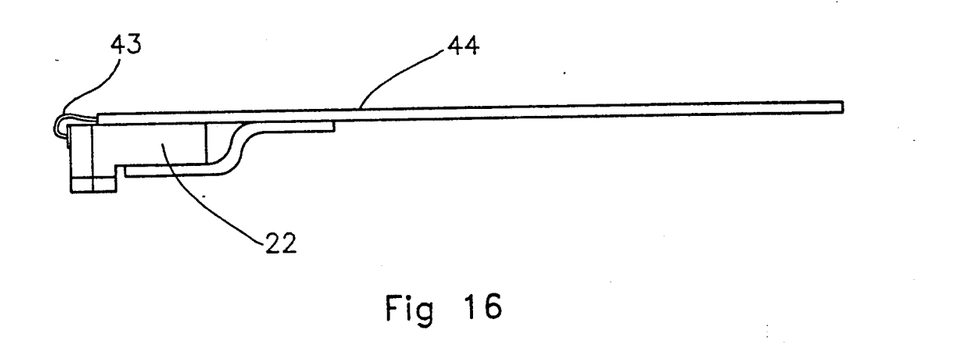
FIG. 16 is a representational view depicting the use of a slider mounted to a flexure or load beam.

During production of the novel single rail sliders with the wear pad at the air bearing surface, a ceramic wafer 40 is finely polished to a smooth mirror finish on one surface. Multiple thin film transducers 26 are deposited simultaneously on the polished surface by well known masking and deposition techniques. As shown in FIG. 10, the transducers 26 are deposited in rows and columns on the wafer 40 which is cut by diamond sawing to form row bars 42, such as shown in FIGS. 11 and 12. The row bars 42 have a number of equally spaced thin film transducers 26, six transducers shown in this example. The row bars are machined and cut, as shown in FIG. 13, to define the L-shaped single rail sliders with the recessed sections 30 and the pedestals 34 on the short legs 35. The machined and cut row bar is shown in FIG. 14. FIGS. 15A and 15B depict the separation of individual single rail sliders 22 from the row bar 42, which is accomplished by ganged diamond saw cutting, for example. The individual single rail sliders with wire connection 43 are mounted to a load beam or flexure 44 of a head arm assembly, as illustrated in FIG. 16.

Figure 17:
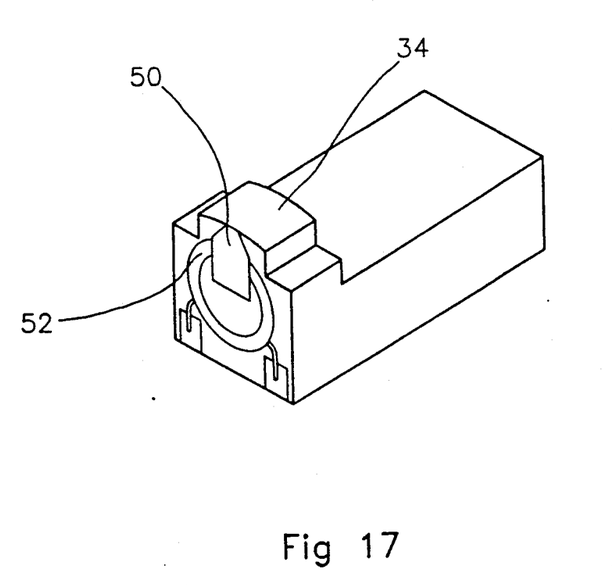
FIG. 17 is an isometric view of a contact recording head, showing a convex wear pad in the form of a crown or button and a transducer, in accordance with this invention.

FIG. 17 depicts a variation of a contact head slider in which the pedestal 34 has an arcuate dome top that allows further reduction of the contact area between the slider and the rotating disk. The pedestal 34, which serves as a rail, is rounded to define a crown or button, with the apex of the button being close to the transducing gap of the transducer 52.

Figure 18A:
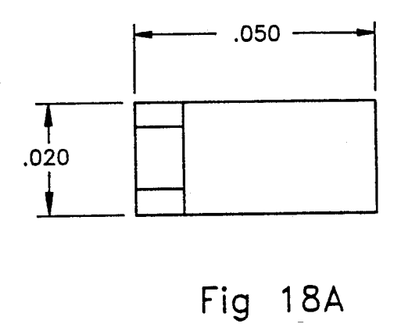
FIGS. 18A–18C are top, side and end views illustrating the dimensions of the single rail slider of this invention.
Figure 18B:
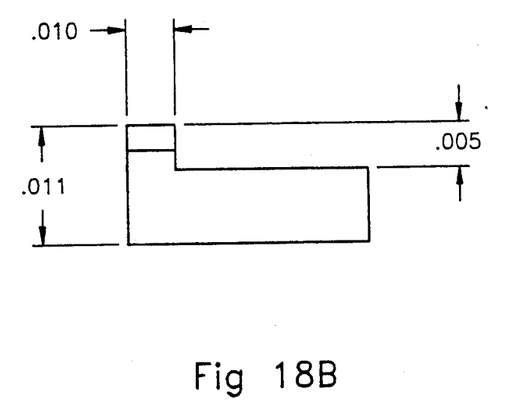
Figure 18C:
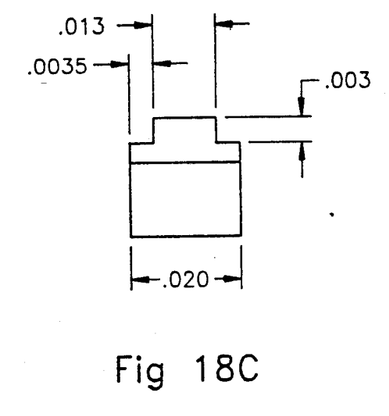

FIGS. 18A–18C present illustrative dimensions, measured in milli-inches, of a single rail slider, made in accordance with this invention. The overall height of the slider is about 0.011 inch, the overall length is about 0.040 inch, and the width is about 0.020 inch. The height of the pedestal is about 0.002 to 0.003 inch. For a disk rotating at about 3,600 rpm, a load force of about 35–50 milligrams is aplied. It should be understood that other dimensions may be used to implement this invention using a single rail and a wear pad. For example, the slider length may be in the range of about 0.030 to 0.060 inch, the width about 0.020 to 0.030 inch and the height about 0.011 to 0.017 inch. The size of the wear pad is preferably about 0.003 to 0.010 inch in length, about 0.003 to 0.010 inch in width, and about 0.002 to 0.003 inch or less in height. The applied load force to the head slider is preferably in the range of 0.1 to 1.0 gram.

Figure 19A:
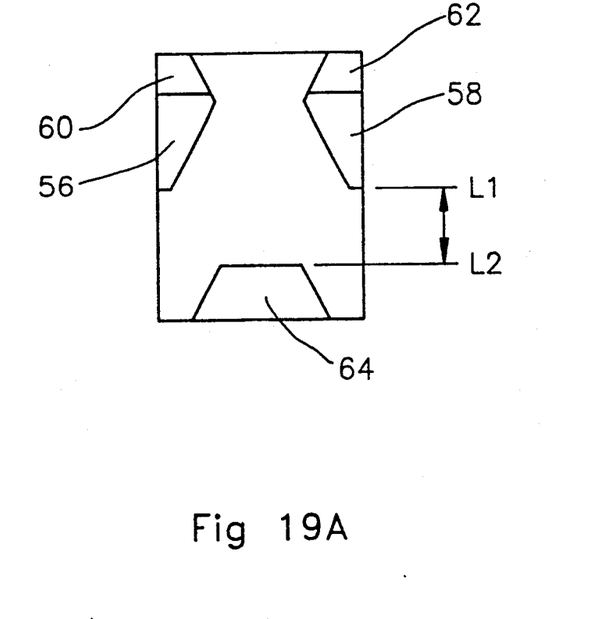
FIGS. 19A and 19B are plan views representating tripad slider designs that are useful as contact recording heads.
Figure 19B:
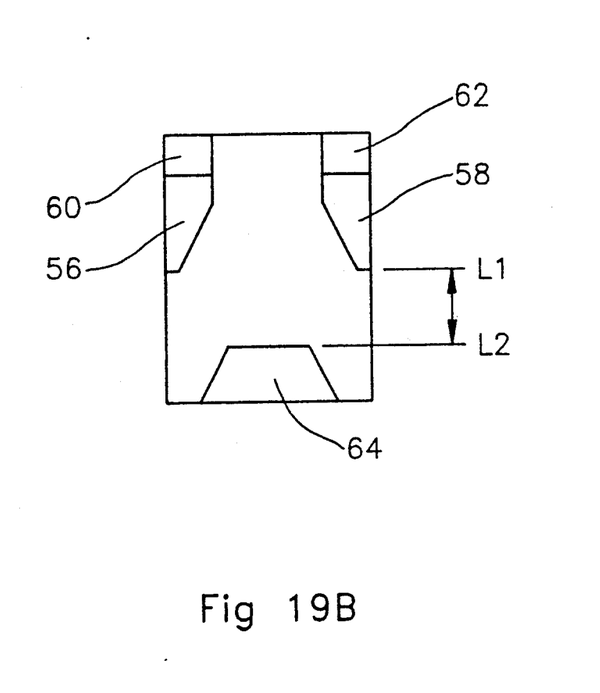

In another embodiment of a slider that functions as a contact head, the air bearing surface is formed in a tripad design, as illustrated in FIGS. 19A and 19B. Tripad slider designs used for flying heads are disclosed in copending patent application Ser. No. 07/846,719, filed Mar. 6, 1992, entitled "Tripad Air Bearing Magnetic Head Slider", and assigned to the same assignee. As shown, two angled pads 56 and 58 are located towards the front and sides of the slider with angled tapers 60 and 62 at the leading edge of the slider adjacent to the front pads 56 and 58. The slope or taper angle is about 40–60 minutes. The tapered areas 60 and 62 are optional and the entire length of the front side pads can be extended to the leading edge without any tapers. A third pad 64 is formed at the rear center of the slider where the transducing gap is located. The third pad 64 is configured with a frustoconical or trapezoidal geometry. To implement the embodiment of a nanoslider contact head, a gram load force in the range of about 0.5 to 3.5 grams is applied to the nanoslider at a point approximately along the center longitudinal axis of the slider in the area between lines L1 and L2, which is between the front pads and the rear pad.

This contact head design is particularly applicable to heads using microsliders and smaller size sliders, such as nanosliders and femtosliders. The reduction in size from one type to the next typically is in the order of about 50–70%. Thus if a microslider is about 0.112 inch long, 0.088 inch wide and 0.024 inch high, a nanoslider would be about 0.080 inch long, 0.063 inch wide and 0.017 inch high, and a femtoslider would be about 0.040 long, 0.020 inch wide and 0.011 inch high. The length of tapers vary with the length of the slider and may be about 0.008 inch for a nanoslider, for example. In one implementation of a nanoslider, the taper angle is typically about 40–60 minutes, but may have an angle in the extended range of 20–90 minutes in some applications. The front side pads 56 and 58 are about 0.025 inch in length or about one-third the total slider length, the width of each front pad is about 0.005 inch at its widest portion, tapering at about 20° to its narrowest width. The rear center pad 64 is about 0.020 inch long at the trailing edge tapering to a width of about 0.008 inch For a gram load of about 1 gram, the flying height is about 2 microinches at a linear speed of the rotating disk of about 650 inches per second. The depth of the cut between the pads is about 0.003 inch. For a femto slider, the two tapers at the leading edge are about 0.005 inch long and have angles of about 40 minutes. The two front pads are about 0.013 inch long and 0.006 inch at the widest point. The rear pad is about 0.013 inch at the trailing edge and is about 0.007 inch in depth. The depth of the cut between the three pads is about 0.003 inch. At about 0.2 gram load at a linear speed of 650 inches per second, the flying height is about 2 microinches.

With the tripad contact slider, contact is made with the disk on all three pads during a stationary disk condition. During rotation of the disk, an air bearing is formed so that the two front pads of the tripad slider fly at a pitch relative to the disk surface, while the third rear pad skims along in contact or in pseudo-contact or close proximity to the disk surface. This configuration allows the flying characteristics of the slider to be controlled when the head is actuated during a seek mode from the inner to the outer diameter of the disk. During contact recording, the actual contact area is a portion of the area of the rear pad due to the presence of pitch provided by the two flying front pads.

During operation of the disk drive with the tripad contact slider, a gram load force is applied at a point along the central longitudinal axis of the slider with a small offset, and behind the trailing ends of the front side pads 56 and 58 and before the leading end of the center rear pad 64, as delineated by lines L1 and L2. The applied gram load force is about 0.5 to 3.5 grams for a nanoslider size head when operating with a disk rotating at about 5,400 rpm.

There has been described herein head sliders used for contact or pseudo-contact recording. In one embodiment, the slider is formed in a substantially L-shaped configuration and effectively is a single rail design. The single rail slider is substantially smaller than conventional head sliders and has minimum mass and weight. The single rail slider can be used for horizontal or longitudinal recording heads. The single rail slider is provided with a wear pad located on a raised section or pedestal of a leg of the L-shaped slider. The small area wear pad is located adjacent to the pole tips and transducing gap of the thin film transducer and has a diameter of less than 10 milli-inches. The wear characteristic of the very small slider is greatly improved by virtue of the substantially reduced size of the contact area between the wear pad and the surface of the rotary disk.

In another embodiment of a contact recording head described herein, the air bearing surface has a tripad design. The tripad contact slider also provides the advantages of high density recording with reduced wear of the sliders and disks. A minimum load force is used to provide a pitch of the slider so that the front pad portion of the slider flys and the rear pad portion with the transducer makes contact with the rotating disk.

Although the invention has been described for use of a contact recording head with a rigid disk, the slider may be used with other magnetic media and for other recording applications. It should be understood that the invention is not limited to the specific configuration or dimensions set forth herein and other modifications may be made within the scope of the invention.

What is claimed is:
1. A thin film magnetic head assembly for transducing data relative to a magnetic medium comprising:
   a head slider formed as a single integral body with only one air bearing longitudinal rail having a leading or upstream edge and a trailing or downstream edge, said slider including a longitudinal section and a leg portion;
   a thin film magnetic transducer disposed at said trailing edge at an end surface of said leg portion of said slider, said transducer being in contact or pseudo-contact with said magnetic medium during the transducing of said data;
   said longitudinal section having an air bearing surface substantially perpendicular to said end surface of said leg portion; and a configured wear pad formed on said pedestal for reducing the contact area between the air bearing surface and said magnetic medium.

2. A thin film magnetic head assembly as in claim 1, wherein said leg portion and said longitudinal section form a L-shaped type configuration.

3. A thin film magnetic head assembly as in claim 2, wherein the height of said longitudinal section is in the range of about 2-10 milli-inches.

4. A thin film magnetic head assembly as in claim 1, including bond pads deposited on said end surface of said leg portion adjacent to said thin film transducer for wiring connection to magnetic head circuitry.

5. A thin film magnetic head assembly as in claim 4, including alternate bond pads disposed adjacent to and orthogonally relative to said bond pads on said end surface of said leg portion.

6. A thin film magnetic head assembly as in claim 1, including a flexure or load beam for mounting said head slider for coaction with said magnetic medium.

7. A thin film head assembly as in claim 6, wherein the length of said slider is about 0.080 inch, the width is about 0.063 inch and the height is about 0.017 inch.

8. A thin film magnetic head assembly as in claim 1, wherein said slider has an overall height of about 0.011 to 0.017 inch, an overall length of about 0.030 to 0.060 inch, and a width of about 0.020 to 0.030 inch.

9. A thin film magnetic head assembly for transducing data relative to a magnetic medium comprising:
   a head slider formed with only one air bearing longitudinal rail having a leading or upstream edge and a trailing or downstream edge, said slider including a longitudinal section and a leg portion;
   a thin film magnetic transducer disposed at said trailing edge at an end surface of said leg portion of said slider;
   said longitudinal section having an air bearing surface substantially perpendicular to said end surface of said leg portion;
   a configured wear pad formed on said pedestal for reducing the contact area between the air bearing surface and said magnetic medium.

10. A thin film magnetic head assembly as in claim 9, wherein said transducer includes magnetic pole tips terminating at said exposed surface of said wear pad.

11. A thin film magnetic head assembly as in claim 9, wherein said wear pad is configured with a crown or button geometry.

12. A thin film magnetic head assembly as in claim 9, wherein said wear pad is about 0.003 to 0.010 inch in length, about 0.003 to 0.010 inch in width, and about 0.002 to 0.003 inch or less in height.

* * * * *